United States Patent [19]

Nikkanen et al.

[11] Patent Number: 5,365,731
[45] Date of Patent: Nov. 22, 1994

[54] EFFICIENT ANTI-ICE EXHAUST METHOD

[75] Inventors: John P. Nikkanen, West Hartford; Robert Bubello, Meridan; Grant P. Maier, Glastonbury, all of Conn.

[73] Assignee: United Technologies Corporation, Hartford, Conn.

[21] Appl. No.: 45,443

[22] Filed: Apr. 8, 1993

Related U.S. Application Data

[62] Division of Ser. No. 872,575, Apr. 23, 1992, Pat. No. 5,257,498.

[51] Int. Cl.⁵ ................................................ F02C 7/047
[52] U.S. Cl. ................................................. 60/39.02
[58] Field of Search .................... 60/39.02, 39.043; 244/34 R, 34 B, 34 C

[56] References Cited

U.S. PATENT DOCUMENTS

| | | | |
|---|---|---|---|
| 2,499,831 | 3/1950 | Palmatier | 244/134 B |
| 2,663,993 | 12/1953 | Mosser | 60/35.6 |
| 2,712,727 | 7/1955 | Morley et al. | 60/39.093 |
| 2,735,612 | 2/1956 | Hausmann | 230/122 |
| 4,406,431 | 9/1983 | Heuberger | 60/39.093 |
| 4,688,745 | 8/1987 | Rosenthal | 244/134 R |
| 4,738,416 | 4/1988 | Birbragher | 60/39.093 |
| 4,782,658 | 11/1988 | Perry | 60/39.093 |

FOREIGN PATENT DOCUMENTS 0205283 5/1986 European Pat. Off. .
59222 4/1949 France .

*Primary Examiner*—Louis J. Casaregola

[57] ABSTRACT

An anti-icing system for a nacelle of a gas turbine powerplant is disclosed. Various construction details have been developed which provide means to exhaust fluid from an inlet shell cavity and into an external medium. In one embodiment, the exhaust means (62) includes a plurality of aerodynamically shaped vanes (66) disposed within the inlet shell cavity (52) and a plurality of exhaust slots (68) wherein each of the vanes is adjacent one of the exhaust slots. The vanes are adapted to turn a portion of the body of fluid flowing within the inlet shell cavity to a direction substantially normal to the direction of flow of the external medium.

4 Claims, 3 Drawing Sheets

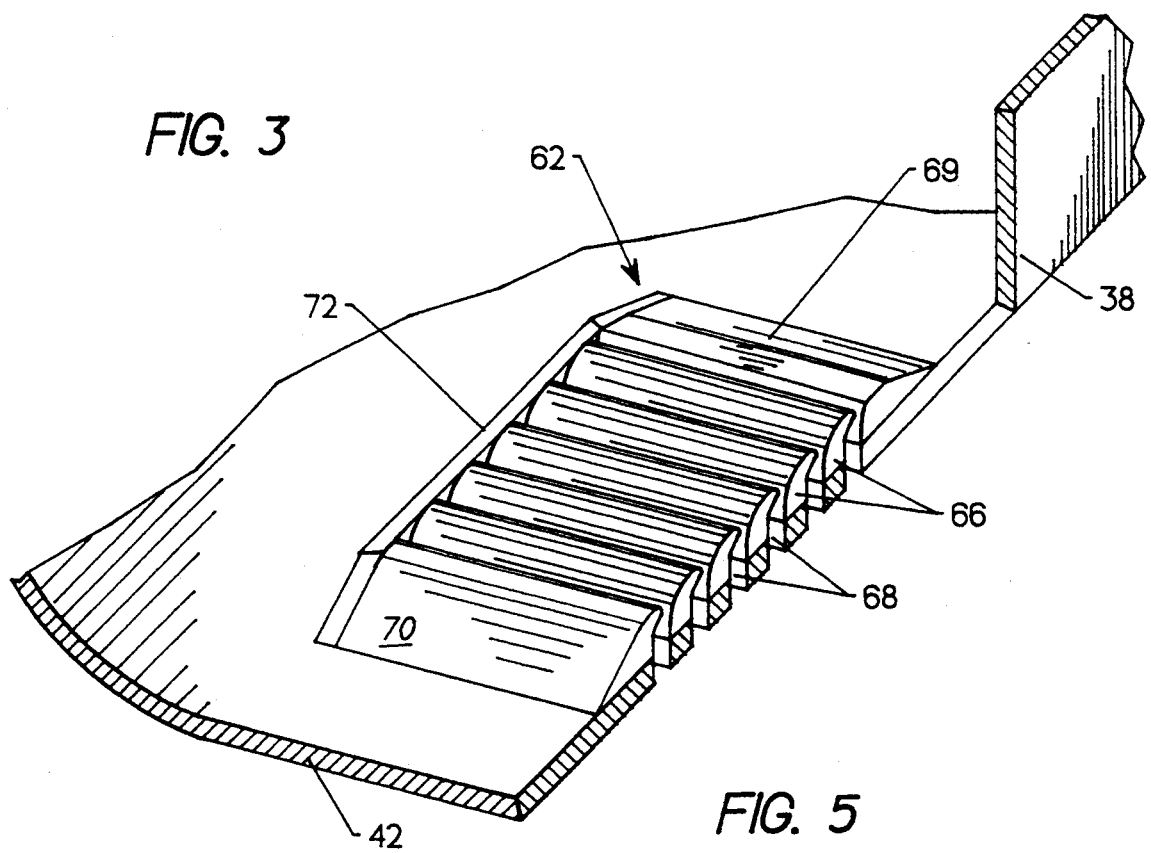
FIG. 3
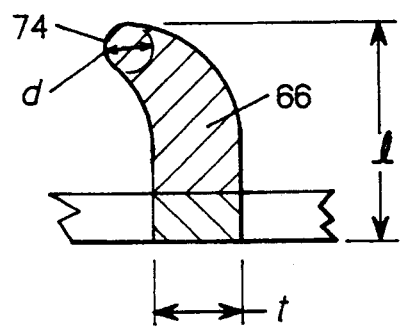
FIG. 5
FIG. 6
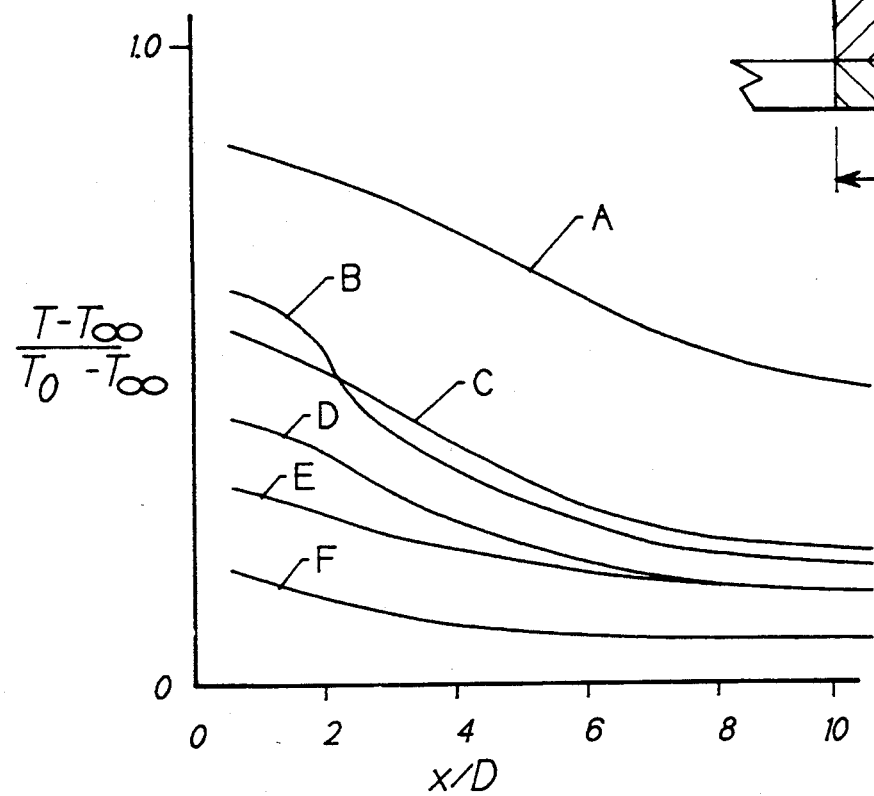

EFFICIENT ANTI-ICE EXHAUST METHOD

This is a division of copending application Ser. No. 07/872,575 filed on Apr. 23, 1992, (U.S. Pat. No. 5,257,498).

TECHNICAL FIELD

The present invention relates to an anti-ice system for a gas turbine powerplant and, more particularly, to exhaust means for anti-ice fluid flowing through a nacelle cavity.

BACKGROUND ART

A typical aircraft powerplant, such as an axial flow gas turbine engine, includes a nacelle which extends about the engine. The nacelle is the radially outermost structure of the powerplant. The nacelle extends forward of the gas turbine engine to define an inlet for working fluid to enter the gas turbine engine. The gas turbine engine includes a flowpath in communication with the fluid inlet of the nacelle. The flowpath extends sequentially through a compressor section, a combustion section and a turbine section. The compression section and turbine section include many components susceptible to impact damage, such as rotating blades which extend across the flowpath and interact with the working fluid.

Safety is a primary concern in the design of powerplants to be used in aircraft applications. One hazard to be avoided is the build-up of ice on the engine and the structure surrounding the engine. The build-up of ice presents many problems. First, ice may add considerable weight to the engine and to the aircraft. Second, the build-up of ice near the inlet of the nacelle may adversely affect the flow of working fluid into and through the engine.

Another concern with powerplants is the useful life of the powerplant and components. The build-up of ice near the inlet of the engine may lead to large pieces of ice breaking loose from the inlet and flowing into the gas turbine engine. Ice flowing into and through the engine may damage components within the engine, such as the blades, and components attached to the nacelle, such as inlet acoustic panels. The damaged components may then require replacement.

Not surprisingly, anti-ice systems for the inlet area of nacelles have been the focus of a significant amount of research and development within the aircraft industry. An example of this is U.S. Pat. No. 4,688,745, entitled "Swirl Anti-Ice System" and issued to Rosenthal. This patent discloses a system for injecting hot gases into an annular cavity located on the leading edge of the nacelle. The cavity extends circumferentially about the inlet. The hot gases are injected into the cavity in a direction tangential to the circumferential direction. The tangential injection produces a circumferentially flowing body of hot gases within the cavity. Exhaust vents or holes located in a bulkhead of the nacelle allow gases within the cavity to escape into the external medium flowing around the powerplant. The venting of the anti-ice fluid prevents over pressurization of the cavity in the event of an anti-ice fluid flow regulator failure. The exhaust holes lie in a plane parallel to the direction of flow to avoid direct impingement of the body of fluid on the exhaust holes.

The anti-ice system disclosed in U.S. Pat. No. 4,688,745 is effective at reducing the built-up of ice on the inlet of the nacelle. There are, however, drawbacks to the use of this anti-ice system. The exhaust fluid removed through the exhaust holes is typically flowed into a chamber within the nacelle. The exhaust fluid exits the nacelle through a vent and flows into the external medium flowing about the nacelle. Flowing the exhaust gases through the nacelle structure may lead to overheating of the nacelle in the vicinity of the chamber.

Further, the fluid exiting the vent tends to be held against the outer barrel skin by the external medium flowing past the outer skin (the free stream). This may lead to overheating of the nacelle surface downstream of the vent. Overheating of the nacelle is especially significant if the nacelle is made from lightweight composite materials. These composite materials are typically bonded together with an adhesive having a lower melting temperature than traditional metallic materials. The rate of temperature decay downstream of the vent is dependent upon the size of the vent and a blowing parameter. Large values for the area of the vent result in a low rate of decay of temperature downstream of the vent. Small values of the blowing parameter, defined as the ratio of exhaust exit velocity to free stream velocity, also result in a low rate of decay of temperature downstream of the vent. The affects of vent size and blowing parameter or the rate of decay of temperature are cumulative.

The vent also introduces aerodynamic penalties in the form of increased drag of the nacelle when the anti-ice system is shut off. The drag caused by the vent is dependent upon the size of the vent and the axial location of the vent. The larger the exit area of the vent or the closer the vent is to the leading edge of the nacelle, the greater the drag attributable to the vent.

A solution to the overheating of the nacelle caused by the exhaust flow through the nacelle is to duct the exhaust flow from the cavity to the vent. Ducting the exhaust fluid through the nacelle structure reduces the likelihood of overheating of the nacelle in the vicinity of the chamber, but also increases the size and weight of the nacelle structure. Attempts to decrease the bulk of the ducts by moving the exhaust vent forward, and thereby shortening the length of the duct, increases the aerodynamic drag of the vent. In addition, the duct does not prevent overheating of the nacelle surface downstream of the vent.

The above art notwithstanding, scientists and engineers under the direction of Applicants' Assignee are working to develop efficient anti-icing systems for the nacelle of a gas turbine powerplant.

DISCLOSURE OF THE INVENTION

The invention is predicated in part upon recognition by the Applicants of the availability within the cavity of a dynamic pressure head to increase the velocity of the exhaust fluid exiting the cavity. Prior art exhaust means rely upon the static pressure differential between the cavity and the environment external to the cavity to produce the exhaust flow. This resulted in low exit velocities for the exhaust fluid and, consequently, large exhaust vents to provide an adequate, volumetric flow rate of exhaust fluid out of the cavity. The combination of small blowing parameter and large vent size results in overheating of the nacelle external surface. Using the dynamic pressure head available from the circumferentially flowing body of fluid increases the exit velocity and decreases the size of the exhaust vent required.

According to the present invention, an anti-ice system for the leading edge of a nacelle includes a cavity bounding a body of fluid having a circumferentially directed component of velocity and means to exhaust the fluid outboard of the nacelle, wherein the exhaust means is adapted to turn the exhaust flow such that it is substantially normal to the direction of flow of ambient air external to the cavity, and wherein the exhaust means is adapted to use the dynamic pressure head within the cavity to urge the exhaust flow to exit the cavity with sufficient exit velocity to penetrate into the medium external of the nacelle.

According to a specific embodiment of the present invention, the exhaust means includes a plurality of aerodynamic vanes disposed within the cavity and on the radially outer portion of the nacelle, a plurality of vent slots disposed between adjacent vanes, an upstream fairing, and a downstream fairing, wherein the plurality of vanes are adapted to turn a portion of the circumferentially flowing body of fluid such that the turned portion of the fluid passes through the slots and out of the cavity. Each of the vanes extend in a direction normal to the principal direction of flow within the cavity. Each of the slots is disposed adjacent to, parallel with, and upstream of, relative to the principle direction of flow within the cavity, one of the vanes.

A principal feature of the present invention is the plurality of aerodynamically, bluntly shaped vanes disposed within the cavity. Another feature is the plurality of exhaust slots. A further feature is the fairings located upstream and downstream of the vanes and slots.

A primary advantage of the present invention is the rate of decay of temperature downstream of the exhaust vent as a result of the exhaust fluid ejection angle, the blowing parameter of the exhaust means, and the size of the exhaust slots. The exhaust fluid is ejected through the plurality of small exhaust slots at an ejection angle substantially normal to the free stream flow direction and with sufficient velocity to penetrate the external medium flowing over the exhaust means. The penetration of the free stream creates a separation between the hot exhaust fluid and the nacelle and prevents reattachment of the exhaust fluid to the surface of the nacelle. Another advantage is the level of efficiency of the exhaust means as a result of the utilization of the dynamic pressure head within the cavity to produce the exhaust flow. The aerodynamic vanes interact with the fluid in the cavity to redirect a portion of it through the slots, rather than relying upon static pressure only to urge the fluid out of the cavity. A further advantage is the reduced aerodynamic drag of the vent, relative to prior art vents, as a result of the reduced size of the vent. The reduced vent size is a result of the increased velocity of the exhaust fluid ejected from the cavity. Another advantage is the tolerance of the exhaust means for non-circumferential flows within the cavity, such as helical flows, as a result of the bluntly shaped vanes. A further advantage is the minimal flow losses within the cavity as a result of the fairings which provide smooth changes in flow area and block flow separation from occurring. Minimizing flow losses within the cavity maximizes the pressure differential available to eject the exhaust fluid from the cavity.

Although the invention is shown and described as means to exhaust fluid from a cavity having a circumferentially flowing body of fluid, the invention is equally applicable for cavities having other types of flow, such as a spiraling or helical flow about a circumferential axis through the annular cavity.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 3 is a perspective view, partially cut away, of the exhaust means.

FIG. 5 is a cross-sectional view of an exhaust vane.

FIG. 6 is a plot of temperature decay as a function of a non-dimensionalized distance downstream of a vent.

BEST MODE FOR CARRYING OUT THE INVENTION

Figure 1:
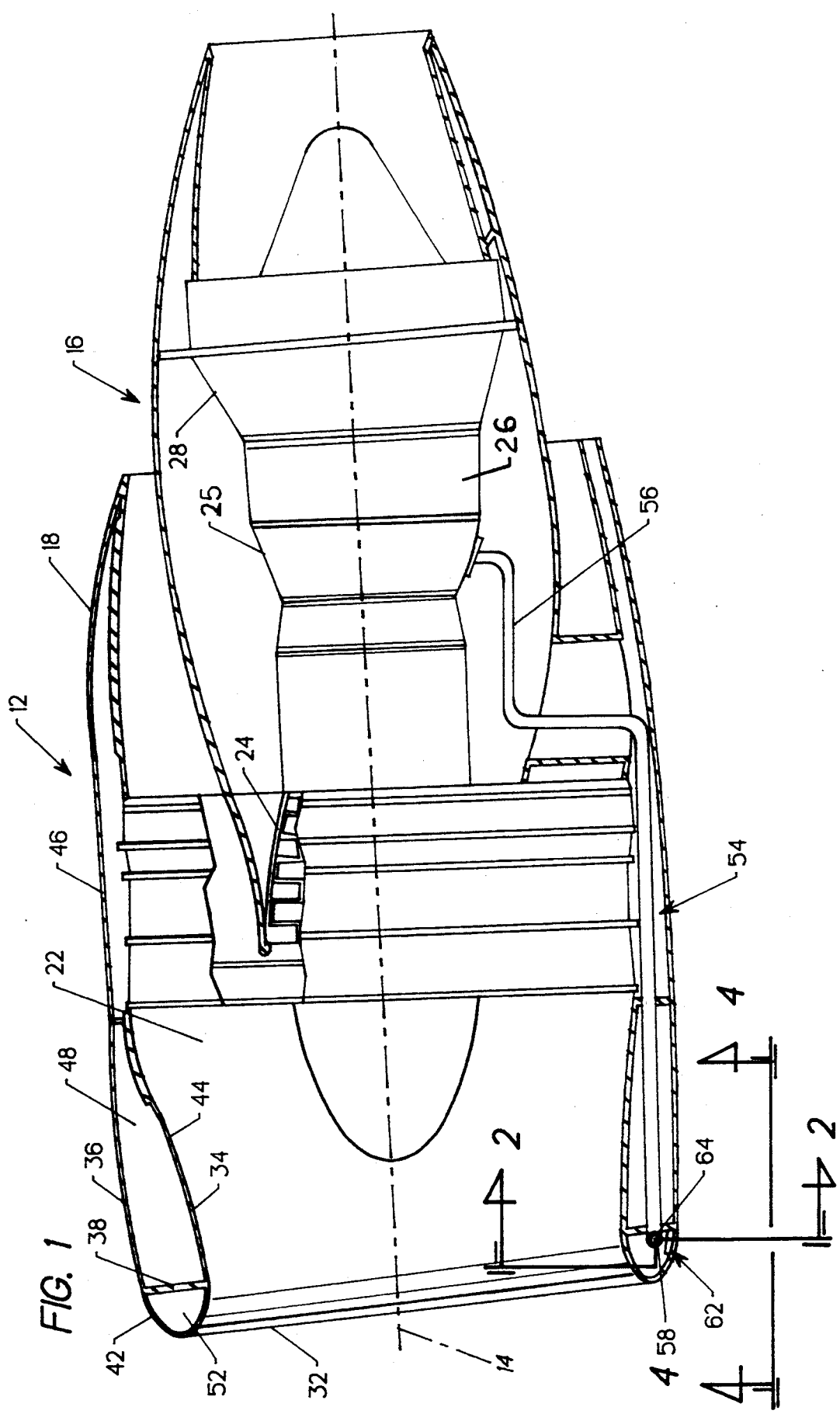
FIG. 1 is a cross-sectional view of a gas turbine engine and a nacelle.

A gas turbine powerplant 12 is illustrated in FIG. 1. The powerplant 12 is disposed about a longitudinal axis 14 and includes an axial flow gas turbine engine 16 and a nacelle 18. The gas turbine engine 16 includes an axially extending flowpath 22, a compression section 24, a diffuser case 25, a combustion section 26, and a turbine section 28. Incoming fluid passes through the nacelle 18 and into the compression section 24 of the gas turbine engine 16. Working fluid is compressed within the compression section 24 which results in an increase in momentum of the working fluid and an increase in temperature of the working fluid. From the compression section 24 the working fluid flows through the diffuser case 25 and into the combustion section 26 where fuel is mixed with the working fluid and the mixture is combusted. The products of combustion are then expanded through the turbine section 28 and then flowed out of the gas turbine engine 16.

The nacelle 18 extends forward of the gas turbine engine 16 and defines an inlet 32 for incoming fluid. The nacelle 18 includes an inner barrel 34, an outer barrel 36, a bulkhead 38, and an inlet shell 42. The inner barrel 34 defines a radially outer flow surface 44 for a portion of the flowpath of the gas turbine engine 16. The outer barrel 36 defines an outer flow surface 46 for the external medium flowing about the gas turbine engine 16. A radial separation between the inner barrel 34 and the outer barrel 36 defines an annular chamber 48 therebetween. The inlet shell 42 is the leading edge for the nacelle. The inlet shell 42 and the bulkhead 38 bound an annular shell cavity 52.

The powerplant 12 includes an anti-ice system 54. The anti-ice system 54 includes a conduit 56, a nozzle 58, and exhaust means 62. The conduit 56 extends between the diffuser case 25 of the gas turbine engine 16 and the shell cavity 52. Although not shown in FIG. 1, the conduit 56 may include a variety of valves and flow regulators to control the flow of fluid through the conduit. The diffuser case 25 is a source of high temperature, high pressure fluid. The nozzle 58 is attached to an outlet end 64 of the conduit 56 and extends within the shell cavity 52. The exhaust means 62 provides fluid communication between the shell cavity 52 and the external medium flowing about the powerplant 12. The exhaust means 62 is disposed on the radially outer portion and axially downstream end of the inlet shell 42. Although the exhaust means 62 may be located at various circumferential positions around the inlet 52, stability of the pressure field of the medium external to the exhaust means 62 may require consideration. As is well known, in aircraft applications a position 180° from top dead center is a region of stable pressure. Therefore, for aircraft application it is suggested that the circumferential location of the exhaust means 62 be 180° from top dead center.

Figure 2:
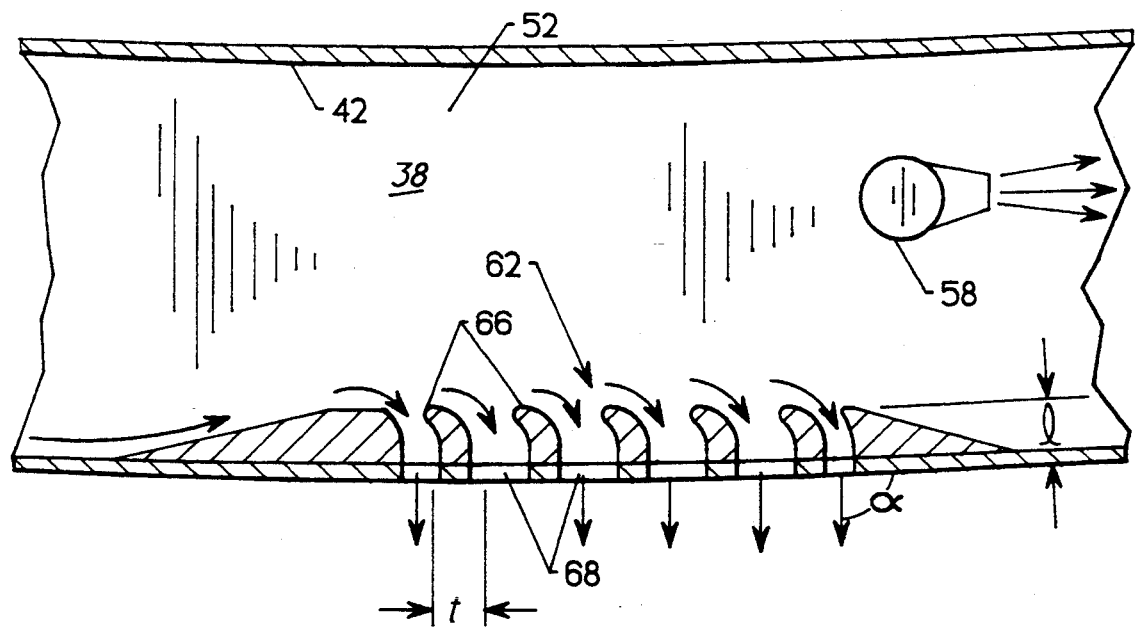
FIG. 2 is a cross-sectional view taken along line 2—2 of FIG. 1 to show a cross-sectional view of a plurality of exhaust vanes.
Figure 4:
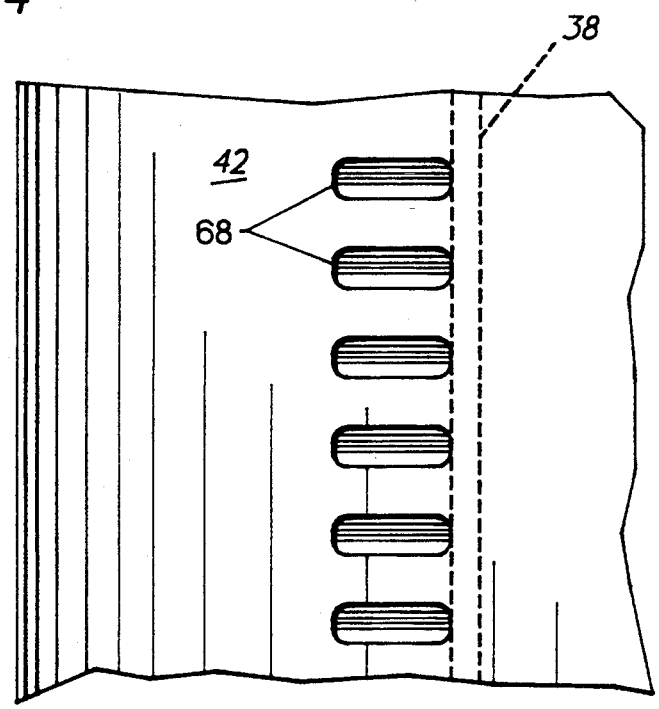
FIG. 4 is a view taken along line 4—4 of FIG. 1, and shows the plurality of exhaust slots.

Referring now to FIGS. 2-4, the exhaust means 62 is located circumferentially adjacent to and upstream of, relative to the flow within the shell cavity 52, the nozzle 58. This location removes fluid which has transferred heat as it travelled around the circumference of the shell cavity 52. In effect, the exhaust means 62 removes relatively cool exhaust fluid from the shell cavity 52.

The exhaust means 62 includes a plurality of vanes 66, a plurality of exhaust slots 68, an upstream fairing 69, a downstream fairing 70, and an axially adjacent wall 72. The plurality of exhaust vanes 66 extend radially inward from the inlet shell 42 and into the shell cavity 52. The plurality of vanes 66 also extend axially. Each vane 66 is aerodynamically shaped to engage the body of fluid flowing circumferentially within the shell cavity. As shown in FIG. 5, the vanes have a rounded leading edge 74 which adapts the vanes to engage with fluid flowing at off angles relative to the circumferential direction. The roundness of the vane leading edge 74 is defined by the ratio of leading edge 74 diameter d, measured as shown in FIG. 5, to maximum thickness t, measured in the circumferential direction. To accommodate off angle flow within the shell cavity 52, it is suggested that the ratio d/t be between 0.4 and 0.6. The shape of the vanes 66 is also dependent upon the ratio of maximum thickness t to vane length 1. It is suggested that the ratio t/1 be between 0.3 and 0.5. While the vanes 66 have been described with respect to various ratios of length 1, thickness t, and leading edge diameter d, it will be appreciated by those skilled in the art that the values of these ratios vary with application and the suggested ranges of values may be transgressed without departing from the scope of the invention.

Each of the exhaust vanes 66 is circumferentially adjacent to and downstream of, relative to the direction of flow of the body of fluid within the shell cavity 52, one of the plurality of exhaust slots 68. The plurality of exhaust slots 68 extend radially through the inlet shell 42 and provide means of communication between the shell cavity 52 and the external medium. The exhaust slots 68 are circumferentially adjacent and extend in an axial direction as shown in FIG. 4.

The upstream fairing 69 provides a smooth transition from the flow surface of the inlet shell 42 to the vanes 66. The downstream fairing 70 provides a smooth transition from the vanes 66 back to the flow surface of the inlet shell 42. The fairings 69, 70 eliminate abrupt changes in cross-sectional area within the shell cavity 52. In accordance with conventional fluid mechanics, the fairings 69, 70 produce smooth flow lines over the exhaust means 62 and uniformly distribute the exhaust flow through the exhaust slots 68. Without the fairings 69, 70, an unequal distribution of the flow through the slots would occur. Unequal distribution implies a flow separation, with corresponding flow losses and inefficiencies, within the shell cavity 52.

FIGS. 1-4 show exhaust means having five (5) vanes and six (6) slots. The quantity and size of the vanes and slots is dependent upon the flow characteristics of the shell cavity and the flow rate of the source of high temperature, high pressure fluid. The quantity and size of the vanes and slots must be sufficient to prevent over pressurization of the shell cavity when subjected to the maximum output of the source of hot fluid. In addition, the quantity and size of the vanes and slots must permit sufficient pressurization of the shell cavity to produce adequate flow velocity through the slots and penetration of the external flow. Temperature considerations dictate having multiple small slots to increase the rate of temperature decay of the fluid exiting each slot. A plurality of small slots produce a higher rate of temperature decay than a single large opening.

During operation of the gas turbine engine 16, compressor discharge fluid is removed from the diffuser case 25. The combustion section 26 is a source of high pressure, high temperature fluid (relative to the external medium) which may be used as heating fluid in the anti-ice system. The fluid is then flowed through the conduit 56, is ejected through the nozzle 58 and into the shell cavity 52. The conduit 56 provides means to flow the high temperature, high pressure fluid into the shell cavity 52. As shown in FIGS. 1 and 2, the fluid is ejected from the nozzle 58 in a direction tangential to the circumferential direction. The nozzle 58 provides means to inject fluid into the shell cavity 52 to generate a flowing body of fluid. The high pressure fluid exits the nozzle 58 with sufficient velocity to entrain the body of fluid within the shell cavity 52 and produce a body of fluid having a principal component of velocity directed in the circumferential direction.

Exhaust means 62 is necessary to prevent over-pressurization of the shell cavity 52. The exhaust means 62 removes fluid from the radially outermost and axially downstream section of the shell cavity 52. The exhaust vanes 66 turn a portion of the flow such that the exhaust fluid is ejected from the cavity with an ejection angle $\alpha$ defined by an the angle formed by the direction of the exhaust flow and the external surface of the nacelle, equal to 90°. Redirecting the flow to a direction substantially normal to the direction of flow of the external medium maximizes the rate of decay of temperature downstream of the exhaust slots 68.

The exhaust vanes 66 utilize the dynamic pressure head within the shell cavity in addition to the static pressure head to urge the fluid through the exhaust slots 68. The combination of dynamic and static pressure head produce an exhaust flow velocity sufficient to permit the exhaust flow to penetrate the external medium flowing by the exhaust slots 68. By penetrating the external medium a separation is created between the hot exhaust fluid and the nacelle 18. The separation region is a low pressure region which pulls in low temperature external medium. As a result, the exhaust fluid mixes with external medium rather than reattaching to the surface of the nacelle 18. In addition, the high velocity of the exhaust flow permits the total area of the exhaust slots 68 to be reduced relative to prior art exhaust vents.

FIG. 6 is an illustration of test results of measured temperature decay as a function of distance downstream. Temperature decay is the ratio of the difference between surface temperature T and free stream temperature $T_\infty$ to the difference between vent exit temperature $T_o$ and free stream temperature $T_\infty$. Distance downstream is shown as a ratio of x/D, where x is the actual distance and D is the effective diameter of the vent. Effective diameter D is the diameter of a circle equal in area to the vent. In this way the downstream distance is non-dimensional and the size of the vent is parametrically accounted for. The vanes provide means to turn a portion of the fluid flowing within the shell cavity to a direction substantially normal to the flow direction of the external medium flowing over the surface of the inlet shell in the vicinity of the exhaust means. Turning the exhaust flow normal to the free stream direction increases the rate of decay of temperature along the surface downstream of the exhaust means, as shown in FIG. 6. Curve "A" represents a circular vent with an ejection angle $\alpha_A=35°$ and a blowing parameter $\beta_A=0.4$. The results used in curve "A" are for comparison purposes and are taken from "Film Cooling with Injection through Holes: Adiabatic Wall Temperatures Downstream of a Circular Hole", ASME Paper No. 68-GT-19, authored by Goldstein, Eckert and Ramsey. Curve "B" represents test results for a circular vent with an ejection angle $\alpha_B=90°$ and a blowing diameter $\beta_B=0.4$. Curve "C" represents test results for a slotted vent with an ejection angle $\alpha_C=90°$ and a blowing parameter $\beta_C=0.4$. Although turning the exhaust flow from a substantially tangential direction ($\alpha_A=90°$) to a direction normal to the free stream ($\alpha_B=\alpha_C=90°$) increases the rate of temperature decay dramatically, improvement in rate of temperature decay may also be produced by ejection angles as low as $\alpha=60°$.

The vanes also provide means to use the dynamic pressure head within the body of fluid flowing in the shell cavity. Using the dynamic pressure head in addition to the static pressure head increases the exit velocity through the exhaust means and decreases the size of the vent required relative to prior art exhaust vents. Higher exit velocity produces a higher blowing parameter $\beta$. Increasing the blowing parameter $\beta$ increases the rate of temperature decay, as shown in FIG. 6. Curves "D" and "E" represent the results for circular and slotted vents, respectively, having a blowing parameter $\beta_D=\beta_E=0.7$. Curve "F" represents the results for a circular vent having a blowing parameter $\beta_F=1.2$.

Smaller vent size D results in a larger value for x/D at a given distance X downstream of the exhaust means. Therefore, smaller vents produce increased rates of temperature decay for a given ejection angle $\alpha$ and blowing parameter $\beta$. The size of the vents or slots may be reduced by increasing the exit velocity, and thereby reducing the size of a slot needed to produce a required volumetric flow rate, and by increasing the number of slots, and thereby reducing the size of each slot.

It should be noted that the vanes 66 and slots 68 are shown in FIGS. 1-4 as extending in a direction normal to the circumferential direction, i.e. they extend axially. The vanes 66 are oriented in this direction to maximize the efficiency of the interaction between the body of fluid flowing within the shell cavity 52 and the exhaust means 62. The principal component of velocity for the body of fluid is directed in the circumferential direction. During operation, however, differing thermal boundary layers may build up around the internal flow surfaces of the shell cavity 52 and may result in the body of fluid within the cavity 52 having a non-circumferential component of velocity. The blunt shape of the vanes 66 adapt the exhaust means 62 to accommodate non-circumferential flow and to urge this type of flow into the exhaust means 62. In some situations, it may be desirable to angle the nozzle 58, or a plurality of nozzles 58, to induce a spiralling or helical flow within the shell cavity 52. For such other flow conditions the vanes 66 and slots 68 may be canted relative to the longitudinal axis 14. Canting the vanes 56 may provide more efficient engagement of the exhaust means 62 with the non-circumferential flow within the shell cavity 52. For typical vanes, efficient engagement anticipates vanes extending in a direction substantially normal to the principal direction of flow the vanes are engaged with.

It should also be noted that, although the diffuser case 25 was described as the source of high temperature, high pressure fluid, other sections of the powerplant 12 may function as a source of high temperature, high pressure fluid. For instance, the compression section 24 may be used. Additionally, the exhaust means 62, though shown and described as ejecting fluid radially outboard of the nacelle, may be disposed to eject fluid radially inward such that the exhausted fluid is recycled into the gas turbine engine 16.

Although the invention has been shown and described with respect to exemplary embodiments thereof, it should be understood by those skilled in the art that various changes, omissions, and additions may be made thereto, without departing from the spirit and scope of the invention.

We claim:

1. A method of preventing ice build-up on a nacelle of an aircraft powerplant, the powerplant including a source of heating fluid and an anti-icing system, the anti-icing system including means to flow heating fluid from the source to a cavity in the nacelle, means to inject heating fluid into the cavity, and means to exhaust fluid from the cavity into a medium external to the nacelle, the method including the steps of:
   flowing heating fluid from the source to the cavity;
   injecting heating fluid into the cavity such that the body of fluid within the cavity has a circumferentially directed component of velocity;
   turning a portion of the fluid within the cavity to a direction substantially normal to the direction of flow of the medium external to the nacelle; and
   ejecting fluid from the cavity into the medium external to the nacelle, the fluid being ejected from the cavity in a direction substantially normal to the direction of flow of the external medium, and the fluid being ejected with a flow velocity sufficient to penetrate the external medium.

2. The method according to claim 1, wherein the means to exhaust fluid includes an aerodynamic exhaust vane and an exhaust slot, the exhaust vane adapted to engage the body of fluid within the cavity to turn a portion of the fluid and urge the portion of the fluid through the exhaust slot, and wherein the step of turning a portion of the fluid within the cavity to a direction substantially normal to the direction of flow of the external medium includes engaging the exhaust vane with the fluid.

3. The method according to claim 1, wherein the step of ejecting fluid includes ejecting the fluid with an ejection angle $\alpha$ greater than 60°.

4. The method according to claim 1, wherein the step of ejecting fluid includes ejecting the fluid with a blowing parameter $\beta$ greater than 0.4.

* * * * *